(12) United States Patent
Jain et al.

(10) Patent No.: US 9,223,055 B2
(45) Date of Patent: Dec. 29, 2015

(54) IDENTIFYING FORMATION, MATRIX AND FLUID RELATED CHARACTERISTICS FROM SUBSURFACE DATA USING FACTOR ANALYSIS

(71) Applicant: SCHLUMBERGER TECHNOLOGY CORPORATION, Sugar Land, TX (US)

(72) Inventors: Vikas Jain, Delhi (IN); Chanh Cao Minh, Katy, TX (US); Denis Heliot, Sugar Land, TX (US); Nicholas Heaton, Houston, TX (US); Kais Gzara, Tunis, TN (US)

(73) Assignee: Schlumberger Technology Corporation, Sugar Land, TX (US)

( * ) Notice: Subject to any disclaimer, the term of this patent is extended or adjusted under 35 U.S.C. 154(b) by 557 days.

(21) Appl. No.: 13/658,502

(22) Filed: Oct. 23, 2012

(65) Prior Publication Data
US 2014/0114576 A1    Apr. 24, 2014

(51) Int. Cl.
| | | |
|---|---|---|
| *G01V 3/14* | (2006.01) | |
| *G01V 5/06* | (2006.01) | |
| *G01V 11/00* | (2006.01) | |
| *G01V 3/32* | (2006.01) | |

(52) U.S. Cl.
CPC . *G01V 11/00* (2013.01); *G01V 3/32* (2013.01)

(58) Field of Classification Search
CPC ............ G01V 3/14; G01V 3/18; G01V 3/32; G01V 11/00; G01V 5/06; G01N 15/08; G01N 24/08; G01N 24/081; G01R 33/44; G01R 33/448; G01R 33/50; G06F 19/00
See application file for complete search history.

(56) References Cited

U.S. PATENT DOCUMENTS

| | | |
|---|---|---|
| 7,069,258 B1 | 6/2006 | Bothwell |
| 7,840,626 B1 | 11/2010 | Keenan |

(Continued)

FOREIGN PATENT DOCUMENTS

| | | |
|---|---|---|
| RU | 2275660 C1 | 4/2006 |
| WO | 2006066047 A1 | 6/2006 |

OTHER PUBLICATIONS

Norbert P. Szabo, Shale Volume Estimation Based on the Factor Analysis of Well-Logging Data, Jul. 13, 2011, Acta Geophysica, vol. 59, No. 5, pp. 935-953.*

(Continued)

*Primary Examiner* — Toan Le
(74) *Attorney, Agent, or Firm* — Kimberly Ballew; Chadwick A. Sullivan

(57) ABSTRACT

A method of interpreting petrophysical measurement data include arranging measurements of at least one physical property of formations into a matrix representing the measurements and selecting a range of number of unobserved factors or latent variables for factor analysis. Factor analysis is performed on the measurement matrix and comprises performing factorization of measurements matrix into a number of factors and performing rotation of the factorization results. Whether the factor loadings for each factor have achieved a "simple structure" is determined and either each of the selected number of factors is associated with a physical parameter of the formations, or one is added to the number of factors and factor analysis and rotation are repeated until factor loadings of all factors have achieved "simple structure" such that the each of the number of factors is associated with a physical property of the formations.

32 Claims, 9 Drawing Sheets

(56) References Cited

U.S. PATENT DOCUMENTS

2005/0231198 A1 10/2005 Beard et al.
2009/0072824 A1 3/2009 Romero

OTHER PUBLICATIONS

Norbert P. Szabo Abstract, Jul. 13, 2011, 3 pp.*
International Search Report and the Written Opinion for International Application No. PCT/US2013/066385 dated Mar. 6, 2014.
Thurstone, L.L., "Multiple-Factor Analysis: A Development & Expansion of the Vectors of Mind", The University of Chicago Press, 1947, pp. 326-329 and pp. 334-345.
Kim, Jae-On and Mueller, Charles W., "Factor Analysis: Statistical Methods and Practical Issues", Quantitative Applications in the Social Sciences, ISBN-13: 978-0803911666, Nov. 1, 1978, 8 pages.
Kim, Jae-On and Mueller, Charles W., "Introduction to Factor Analysis: What It Is and How To Do It", Quantitative Applications in the Social Sciences, ISBN-13: 978-0803911659, Nov. 1, 1978, 3 pages.

* cited by examiner

IDENTIFYING FORMATION, MATRIX AND FLUID RELATED CHARACTERISTICS FROM SUBSURFACE DATA USING FACTOR ANALYSIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of analysis of measurements made of physical characteristics of subsurface formations. More specifically, the disclosure relates to techniques for such interpretation using factor analysis.

In interpretation and analysis of "well log" measurements (i.e., measurements made by moving sensing instruments through a wellbore drilled through the formations) using techniques known in the art, a plurality of measurements each of different formation physical properties may be made and/or recorded to enable determination of the formation mineral (matrix) content and characteristics of fluids present in the formation pore spaces (porosity).

Measurement of a single property of subsurface formations, such as nuclear magnetic resonance (NMR) transverse relaxation times (T2), can yield an array, e.g., a T2 distribution, of components providing information about various fluids occupying the pore space in formations. Such measurements may be called a "one-to-many" type of measurement. Similarly, measurements of a plurality of different physical properties may be made to provide information about the same formation physical property such as the fractional volume of pore space (quantified porosity) e.g., using gamma-gamma density measurements, neutron-gamma density porosity measurements, thermal neutron porosity measurements, epithermal neutron porosity measurements, acoustic property determined porosity using compressional and shear wave acoustic data, etc., which may be called a "many-to-one" type of measurement. Both these types of measurements can be difficult to interpret or reconcile due, for example, to insufficient information about the actual fluid/matrix/formation characteristics, for instance the type and volume of fluids downhole in the case of NMR T2 distribution and the actual porosity in the case of the above example apparent porosity measurements.

Conventional interpretation workflows, such as one sold under the service mark ELAN FE, (a service mark of Schlumberger Technology Corporations, Sugar Land, Tex.) requires a priori knowledge of certain subsurface formation characteristics to set up an input parameter matrix to resolve all the input measurements simultaneously within set constraints and uncertainties to determine the fluid and matrix volumes or other desired physical properties of the formations.

A number of empirical methods are available whereby generally two or more equations using measurements related to two or more physical properties are solved simultaneously for two or more unknowns. Such methods may be implemented as computations or may be graphical, but may require some a priori knowledge of the subsurface environment and possible input parameters obtained through experience, offset wellbore information or iteration.

Consonant or "pseudo"-consonant type measurements in space or time (for example measurements made at the same time over multiple depth-of-investigation or measurements made at different times with the same depth of investigation using, e.g., logging while drilling ["LWD"] time lapse measurements or measurements made using LWD and subsequent wireline measurements) may be solved simultaneously to infer certain desired underlying fluid/matrix/formation properties. Such methods have been proven to be effective but may require additional measurements or additional time and resources to perform the same measurements at different times and/or geodetic locations. Even with such information the underlying formation characteristics are hard to fathom and interpret.

There has been some work on understanding underlying formation/fluid/matrix characteristics using such statistical techniques as principal component analysis (PCA) or independent component analysis (ICA). Such techniques may help in dimensionality reduction, for example projecting 64 component or dimensional T2 distribution data onto a six Principal Component orthogonal subspace, but the techniques themselves do not readily provide complete understanding and interpretation of the underlying formation mineral, porosity and pore fluid characteristics.

Thus, there still remains a need to better assess correct underlying formation, fluid and matrix characteristics to be able to apply any of the foregoing techniques that may require a priori information as input thereto.

SUMMARY

One aspect of the disclosure is a method for interpreting petrophysical measurement data. An example method includes arranging measurements of at least one physical property of formations made by at least petrophysical measuring instrument into a matrix representing the measurements and selecting a number of unobserved factors or latent variables for factor analysis. Factor analysis is performed on measurement matrix and comprises performing factorization of the measurements matrix into the number of factors and performing rotation of the factorization results. Whether the factor loadings for each factor have achieved a "simple structure" is determined and either each of the selected number of factors is associated with a physical parameter of the formations, or one is added to the number of factors and the factor analysis and rotation are repeated until the factor loadings of all factors have achieved "simple structure" such that the each of the number of factors is associated with a physical property of the formations.

Other aspects and advantages of the invention will be apparent from the description and claims which follow.

DETAILED DESCRIPTION

The present description will begin with example systems for acquiring and processing data according to various example techniques. Following will be a description of various example techniques for processing data so acquired. The methods or means of conveyance of various well logging instruments may include any methods or means of conveyance known to those of ordinary skill in the art.

Figure 1:
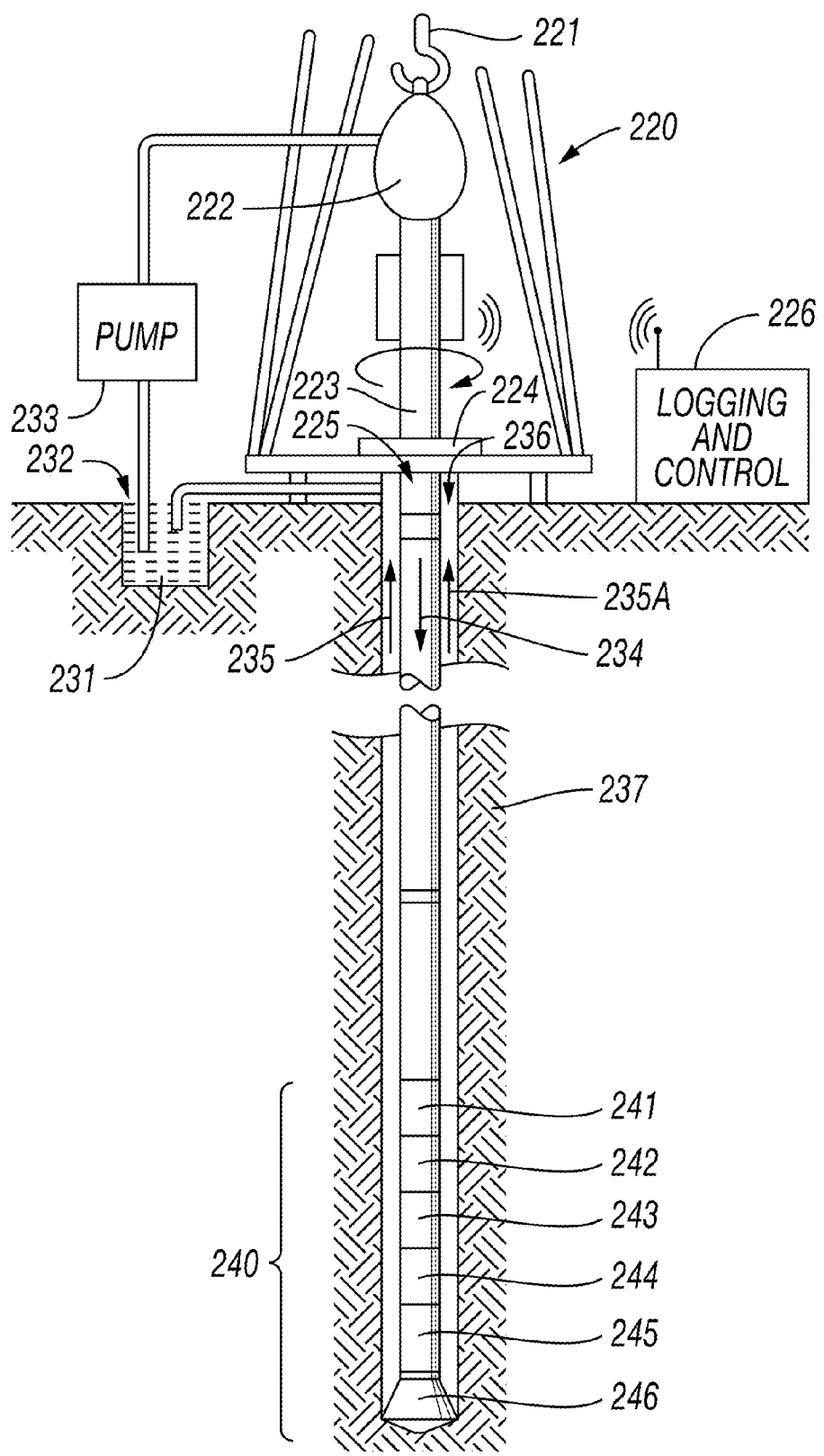
FIG. 1 shows an example wellsite system that may be used to acquire data to be used in various example processing techniques.

FIG. 1 illustrates a wellsite system in which data to be used according to examples of the present disclosure may be used. The wellsite can be onshore or offshore. In this example system, a borehole is formed in subsurface formations by rotary drilling in a manner that is well known. A drill string 225 is suspended within a borehole 236 and has a bottom hole assembly (BHA) 240 which includes a drill bit 246 at its lower end. A surface system 220 includes platform and derrick assembly positioned over the borehole 236, the assembly including a rotary table 224, kelly (not shown), hook 221, and rotary swivel 222. The drill string 225 is rotated by the rotary table 224 energized by means not shown, which engages the kelly (not shown) at the upper end of the drill string 225. The drill string 225 is suspended from the hook 221, attached to a traveling block (also not shown), through the kelly (not shown) and the rotary swivel 222 which permits rotation of the drill string 225 relative to the hook 221. As is well known, a top drive system could be used instead of the rotary table system shown in FIG. 1.

In the illustrated example, the surface system further includes drilling fluid or mud 232 stored in a pit 231 formed at the well site. A pump 233 delivers the drilling fluid to the interior of the drill string 225 via a port (not shown) in the swivel 222, causing the drilling fluid to flow downwardly through the drill string 225 as indicated by the directional arrow 234. The drilling fluid exits the drill string via ports (not shown) in the drill bit 246, and then circulates upwardly through an annulus region 235 between the outside of the drill string 225 and the wall of the borehole 236, as indicated by the directional arrows 235 and 235A. In this well known manner, the drilling fluid lubricates the drill bit 246 and carries formation cuttings up to the surface as it is returned to the pit 231 for recirculation.

The BHA 240 of the illustrated embodiment may include a measuring-while-drilling (MWD) tool 241, a logging-while-drilling (LWD) tool 244, a rotary steerable directional drilling system 245 and motor, and the drill bit 250. It will also be understood that more than one LWD tool and/or MWD tool can be employed, e.g. as represented at 243.

The LWD tool 244 is housed in a special type of drill collar, as is known in the art, and can contain one or a plurality of known types of logging tools. The LWD tool 244 may include capabilities for measuring, processing, and storing information, as well as for communicating with the surface equipment. In the present example, the LWD tool 244 may any one or more well logging instruments known in the art, including, without limitation, electrical resistivity, acoustic velocity or slowness, neutron porosity, gamma-gamma density, neutron activation spectroscopy, nuclear magnetic resonance and natural gamma emission spectroscopy.

The MWD tool 241 is also housed in a special type of drill collar, as is known in the art, and can contain one or more devices for measuring characteristics of the drill string and drill bit. The MWD tool 241 further includes an apparatus 242 for generating electrical power to the downhole system. This may typically include a mud turbine generator powered by the flow of the drilling fluid, it being understood that other power and/or battery systems may be employed. In the present embodiment, the MWD tool 241 may include one or more of the following types of measuring devices: a weight-on-bit measuring device, a torque measuring device, a vibration measuring device, a shock measuring device, a stick slip measuring device, a direction measuring device, and an inclination measuring device. The power generating apparatus 242 may also include a drilling fluid flow modulator for communicating measurement and/or tool condition signals to the surface for detection and interpretation by a logging and control unit 226.

Figure 2:
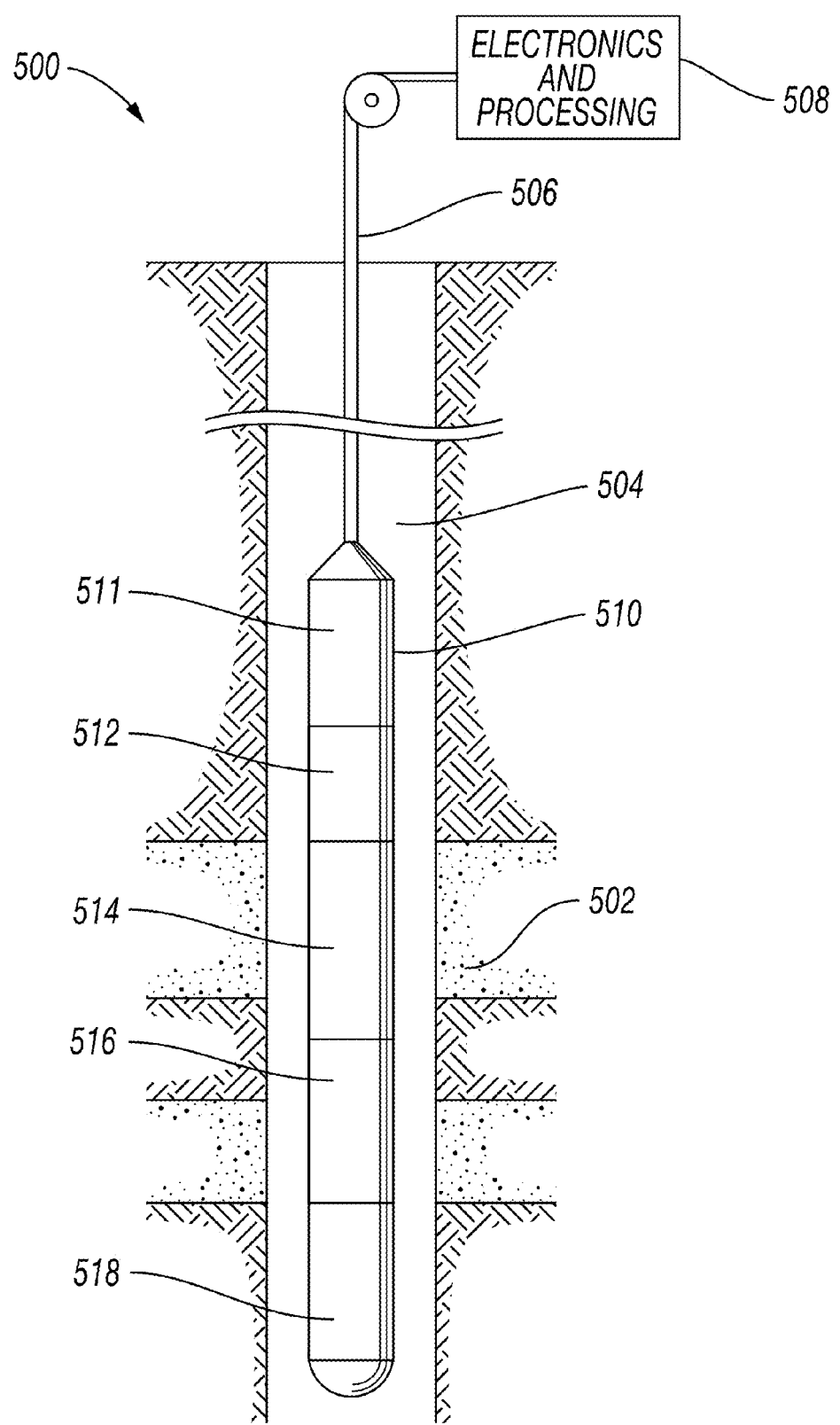
FIG. 2 shows a wireline well logging instrument and acquisition system that may be used to acquire data to be processed by various example techniques.

Referring to FIG. 2, an example wireline tool 510 is shown that may be another environment in which aspects of the present disclosure may be implemented. The example wireline tool 510 is suspended in a wellbore 504 from the lower end of an armored multiconductor cable 506 that is spooled on a winch (not shown) at the Earth's surface. At the surface, the cable 506 is communicatively coupled to an electronics and processing system 508. The example wireline tool 510 includes an elongated body that may include a scintillation type radiation detector with a multichannel analyzer. Additional components may also be included in the wireline tool 510. The wireline tool may include various sensing devices shown at 511, 512, 514, 516 and 518 that may be one or more of the various example devices as explained with reference to FIG. 1. Element 511 may include a telemetry system to enable transmission of signals from the example devices 512, 514, 516, 518 to the surface in a decodable form by equipment in the surface electronics 508.

Though FIGS. 1 and 2 illustrate example while-drilling and wireline systems of conveyance, respectively, other systems of conveyance can be used. Examples of other systems of conveyance that can be used with certain aspects described in the foregoing disclosure include coiled tubing, drillpipe, and slickline systems.

Certain aspects or components of the invention can comprise a computer program that embodies the functions described herein and illustrated in the flow charts. The computer (not shown) may be disposed at the surface, e.g., in logging and control unit 226 in FIG. 1 or electronics and processing system 508 in FIG. 2. However, it should be apparent that there could be many different ways of implementing the invention in computer or algorithmic programming, and the invention should not be construed as limited to any one set of program instructions. Further, a skilled programmer would be able to write such a program to implement an embodiment of the disclosed invention based on the flow charts and associated description in the application text. Therefore, disclosure of a particular set of program code instructions is not considered necessary for an adequate understanding of how to make and use the invention.

It will also be appreciated by those skilled in the art that the foregoing measurements may also be made on samples of formations obtained from drill cuttings (returned to the surface as shown in FIG. 1), from drilled core samples or other types of rock samples, e.g., percussion cores, sidewall drilled cores, etc. Measuring devices such as those explained with reference to FIGS. 1 and 2 are known in the art to be available in configurations for use in a laboratory or other location outside of a wellbore. For purposes of the present disclosure, all such measuring instruments, whether used at the surface on formation samples or whether used in wellbores as explained with reference to FIGS. 1 and 2 may be referred to herein as "petrophysical measuring instruments."

Figure 3:
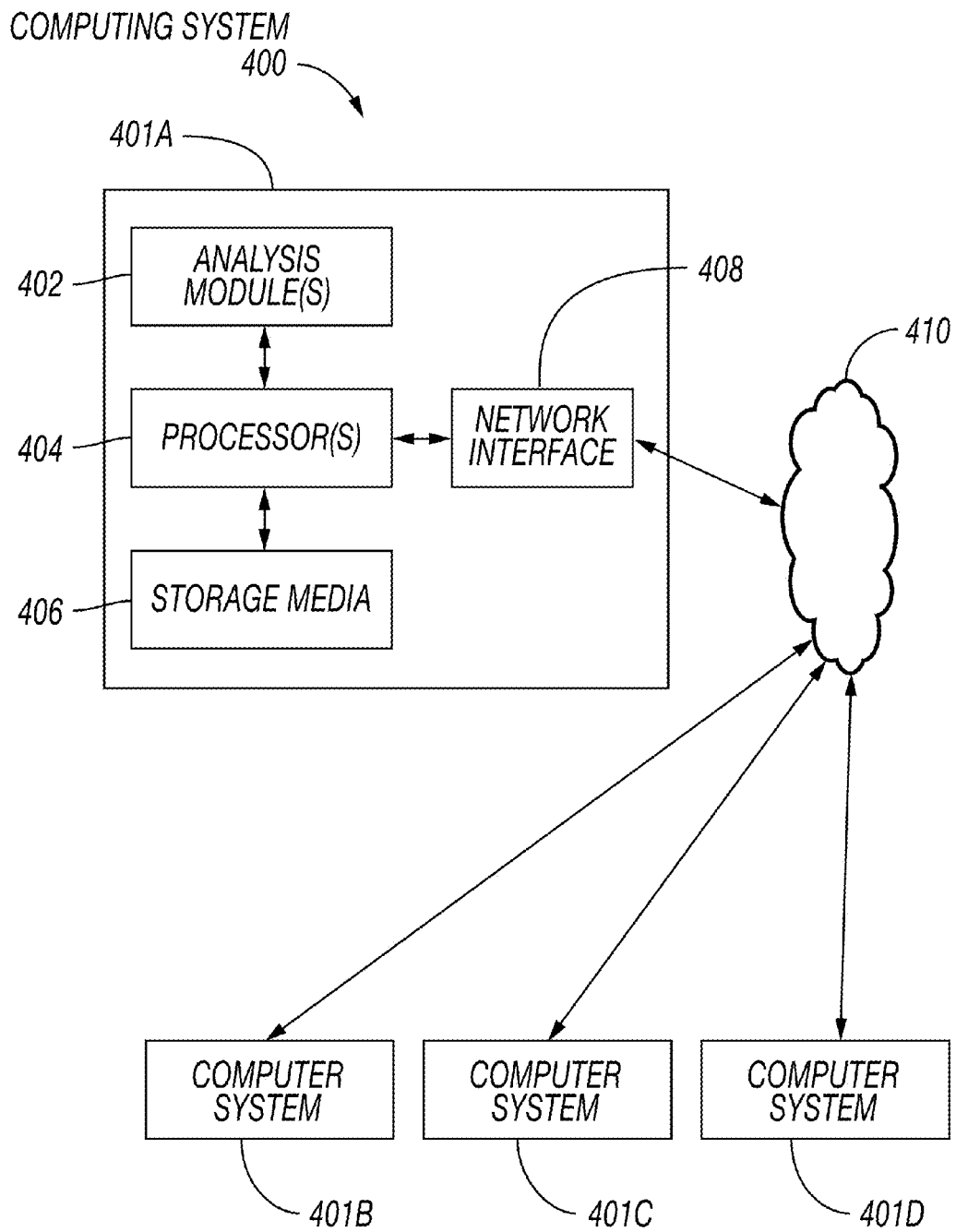
FIG. 3 shows an example computer system that may be used to implement various data processing procedures.

FIG. 3 depicts an example computing system 400 in accordance with some embodiments. The computing system 400 can be an individual computer system 401A or an arrangement of distributed computer systems. The computer system 401A may include one or more analysis modules 402 that are configured to perform various tasks according to some embodiments, such as the tasks depicted in FIG. 4 to be further explained below. To perform these various tasks, analysis module 402 may execute independently, or in coordination with, one or more processors 404, which may be connected to one or more storage media 406. The processor(s) 404 may also be connected to a network interface 408 to allow the computer system 401A to communicate over a data network 410 with one or more additional computer systems and/or computing systems, such as 401B, 401C, and/or 401D. Note that computer systems 401B, 401C and/or 401D may or may not share the same architecture as computer system 401A, and may be located in different physical locations, e.g. computer systems 401A and 401B may be at a wellsite (FIGS. 1 and 2), while in communication with one or more computer systems such as 401C and/or 401D that are located in one or more data centers, and/or located in varying countries on different continents.

A processor can include a microprocessor, microcontroller, processor module or subsystem, programmable integrated circuit, programmable gate array, or another control or computing device.

The storage media 406 may be implemented as one or more computer-readable or machine-readable storage media. Note that while in the example embodiment of FIG. 9 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 400 is only one example of a computing system, and that computing system 400 may have more or fewer components than shown, may combine additional components not depicted in the example embodiment of FIG. 3, and/or computing system 400 may have a different configuration or arrangement of the components depicted in FIG. 3. The various components shown in FIG. 3 may be implemented in hardware, software, or a combination of hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Having explained systems for acquiring (and recording) data, an example procedure will now be explained, specifically with reference to the flow chart in FIG. 4. Example methods may use a procedure called "factor analysis" in order to determine what physical parameters and their interrelationships best evaluate variation in the measurements made by the respective well logging instruments such as those explained with reference to FIGS. 1 and 2.

Figure 4:
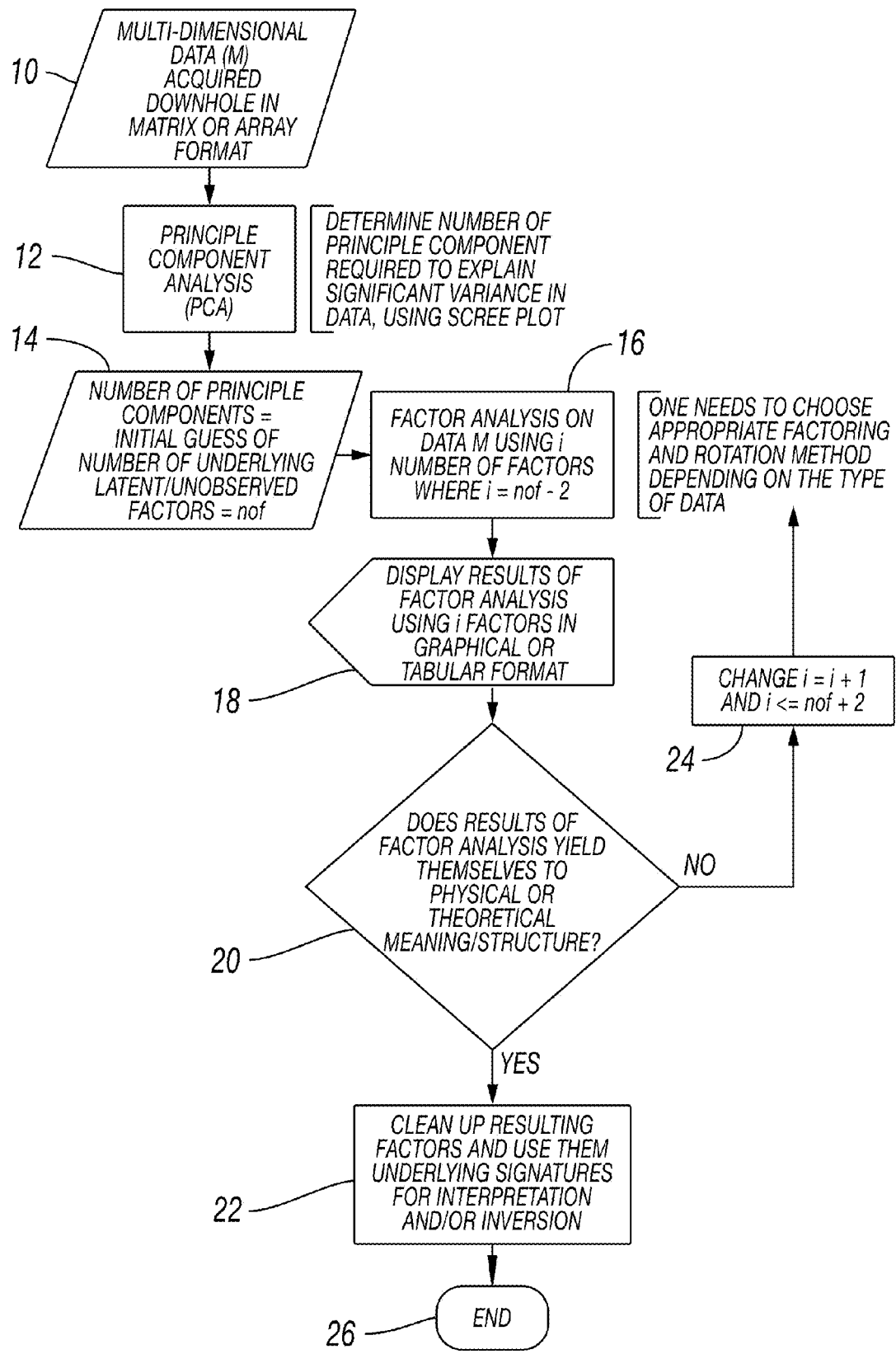
FIG. 4 shows a flow chart of an example data processing procedure.

In FIG. 4, the measurements made by the various well logging instruments may first be ordered into a matrix of measurements indexed over time or depth. In such matrix each measurement may be linearly related to a smaller number of unobserved factors or latent variables, that is each measurement can be represented as a linear function of factors and an error term. These underlying factors can be uncorrelated or correlated. At 12, a principal component analysis (PCA) may be performed on the foregoing data matrix. PCA can be used to estimate number of most significant orthonormal principal components that could describe user desirable variance in acquired multi-dimensional data. PCA can also be used to reduce data dimensionality ("dimensionality reduction"). In the present example, number of most significant principal components from the PCA analysis may be used as starting estimate for the number of factors with a hypothesis of whether latent factors are uncorrelated or are correlated. One example method to determine number of significant principal components is to generate a "scree plot", which may be in graphic or tabular form (and may be automatically performed on a computer system such as shown in FIG. 3). The eigenvalue of each principal component is equal to the variance of data described by that principal component. A scree plot is a simple line plot showing the fraction of total variance in the measurements (data) explained by each principal component where principal components are ordered and indexed by decreasing contribution to total variance. The number of significant principal components can be selected at the point of separation or "elbow" normally seen in such a plot. Similarly a cumulative variance plot can be constructed where the cumulative fraction of variance is plotted as contrasted with just the fraction of variance. Using such a plot, the user can decide how many significant principal components may be needed to describe a defined variance in data. The foregoing is shown at 14 in FIG. 4. The number of important or significant principal components may be selected as an initial estimate of number of factors (nof). Other options to select initial number of factors is to use a priori theory and retaining number of factors that gives the most interpretable solution (as shown at 20 in FIG. 4).

At 16, factor analysis may be performed on the measurement data matrix determined at 10, where an initial number of factors (i) selected may be related to the number of principal components determined at 12. In the present example $i_1$, i.e., the initial number of factors, may be set to nof−2. Having selected an initial number of factors, the data can be factorized into the selected number of factors using any of the variety of methods available, including but not limited to common factor models like "Maximum Likelihood" and "Principal Axis" or component models like "Principal Component Analysis or PCA". Normally common factor models are more suitable for the purpose of latent variables or unobserved factors extraction and thus, recommended for proposed techniques of subsurface data analysis using Factor Analysis. Factors are vectors of correlation coefficients, called "factor loadings", between measurements (rows) and unobserved factors or latent variables (columns). In other words, factor loading describes how much of the measurement is loading on the factor or how much of variance in the measurement is described by the particular factor. Squared factor loading is the percent of variance in that indicator measurement explained by that factor. Thus the sum of the squares of factor loadings of each of the factors will describe the fraction of total variance in data described by each factor. Un-rotated factors maximize the fraction of total variance in data accounted for by each factor by having most measurements load on the early factors, and usually having many measurements load substantially on more than one factor. Factors may also be constructed so as to be orthogonal or uncorrelated. Such un-rotated factors are not easily understandable or interpretable and do not reveal latent variables affecting the well log measurements. Thus one applies rotation to determine a set of loadings that fit the observed data equally well but can be more easily interpreted by seeking so-called simple tructure. See, for example, Thurstone, L. L. (1947), "Multiple-factor analysis: A development and expansion of the vectors of mind", Chicago: University of Chicago Press. Simple structure seeks the rotated loadings such that minimum number of factors can describe variance in a measurement and minimum number of measurements load on a factor, wherein a desired result is to group measurements by the factors. This grouping of measurements facilitates physical interpretation of a factor by hypothesizing and confirming an unobserved physical characteristic related to the formation matrix or fluid that can most affect and describe variance observed in that particular group of measurements. The associated factor then is deemed to represent that unobserved physical characteristic. Rotation can be orthogonal where factors are hypothesized to be uncorrelated or can be oblique where factors are hypothesized to be correlated. A computer such as shown in FIG. 3 can carry out rotations satisfying certain criteria. One example of such orthogonal rotation is known using the "Varimax" criterion which attempts to maximize the variance of squared loadings on a factor, producing some high loadings and some low loadings for each factor (Kim & Mueller, 1978). Other techniques for oblique rotation, for example, "Direct Oblimin" and "Promax" are known in the art. In general oblique rotation methods are preferable and produce simpler, interpretable solutions. In cases where factors are correlated, oblique rotation will produce better simple structure and will facilitate interpretation as opposed to using inappropriate orthogonal methods. In cases where factors are orthogonal, oblique rotation will yield uncorrelated factor correlations close to zero and factor loadings very similar to orthogonal rotation.

At 18 in FIG. 4, the results of the foregoing factor analysis using i factors may be tabulated or graphically presented. Tabulation and/or graphic presentation may be performed on a computer system such as shown in FIG. 3. At 20 in FIG. 4, the results of the first application of factor analysis tabulated at 18 may be evaluated to determine whether the number of factors are such that the factors correspond to physical interpretation as described above.

Figures 5, 6:
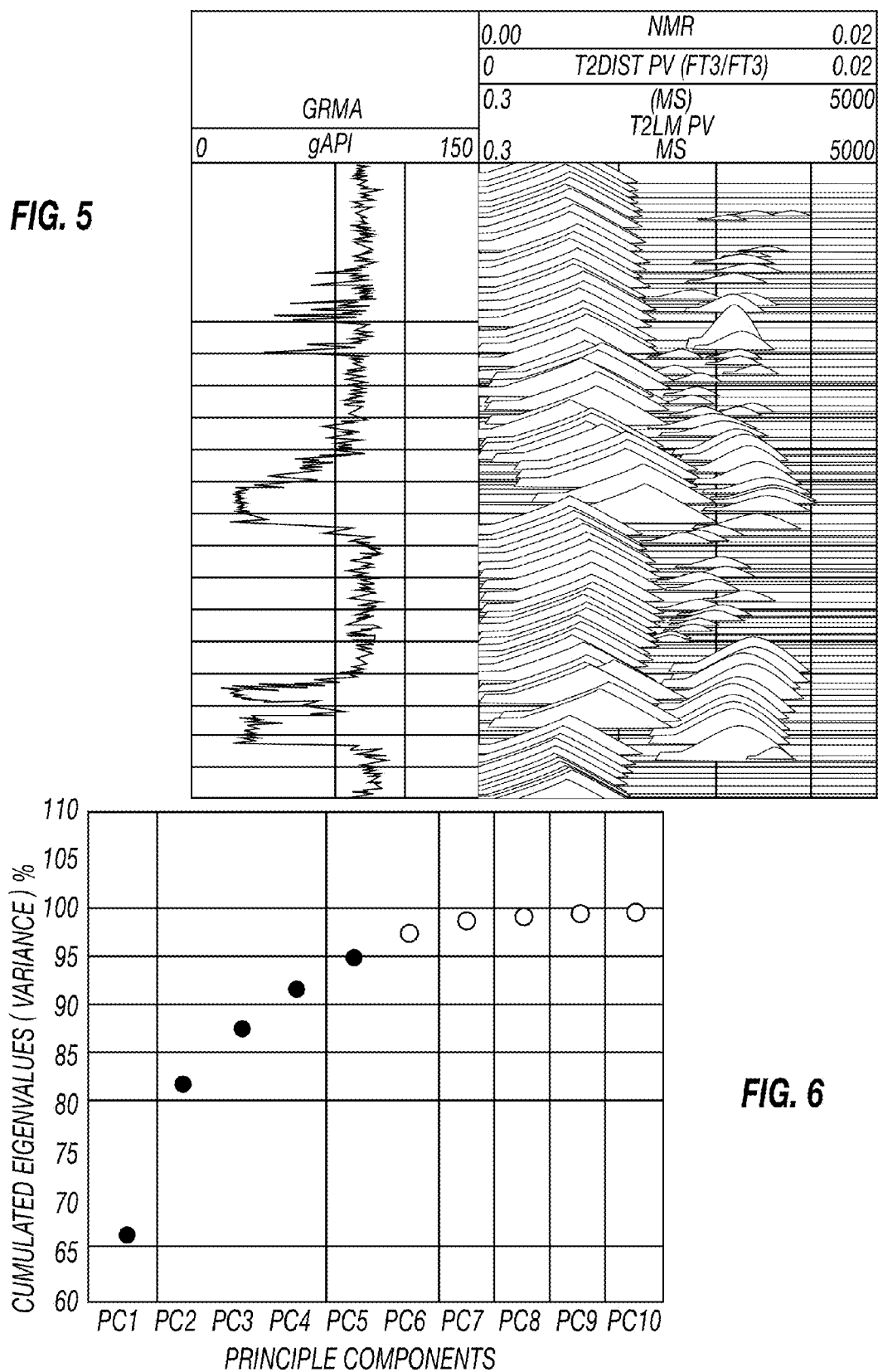
FIG. 5 shows an example of nuclear magnetic resonance (NMR) transverse relaxation time (T2) distribution data analyzed using conventional analysis techniques.
FIG. 6 shows the results of PCA performed on the same set of NMR measurements shown in FIG. 5.

FIG. 5 shows an example of nuclear magnetic resonance (NMR) transverse relaxation time (T2) distribution data analyzed using conventional analysis techniques. FIG. 6 shows the results of PCA performed on the same set of NMR measurements such as explained above. In the present example, it may be observed that only five principal components may determine 95% of the variation in the observed measurement data. This number of principal components may be used as an initial estimate of the number of factors for factor analysis, as explained above.

Figure 7:
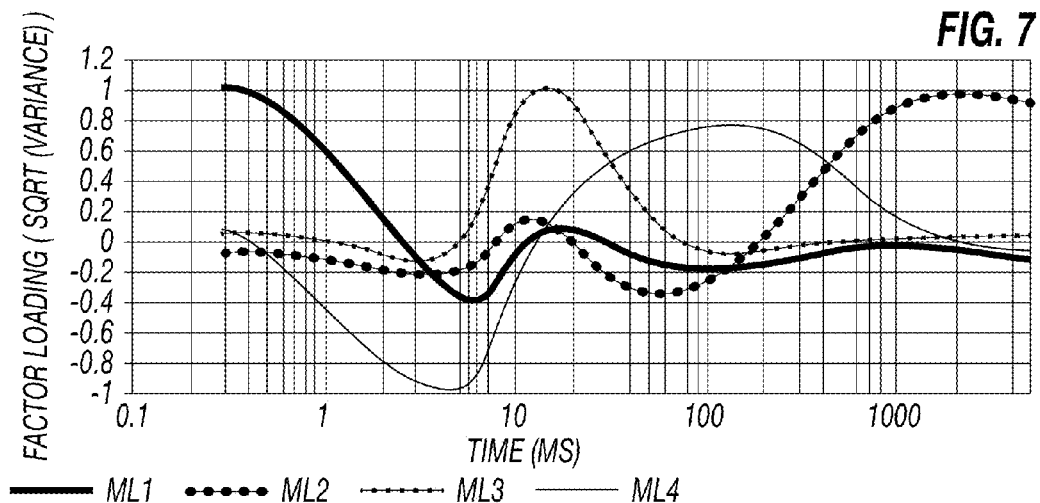
FIG. 7 shows an example of the T2 data analyzed by factor analysis using only four factors.
Figure 8:
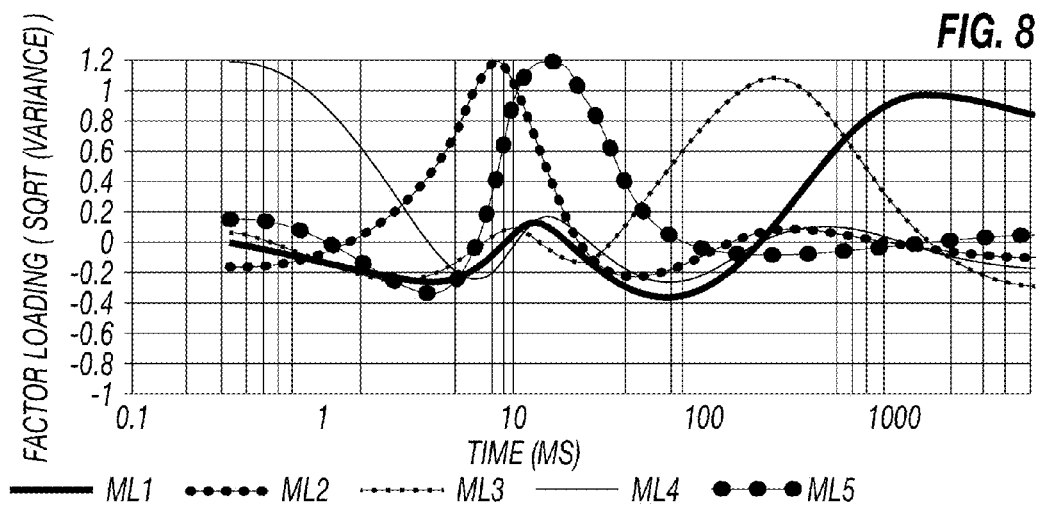
FIG. 8 shows an example of the T2 data analyzed by factor analysis using five factors.
Figure 9:
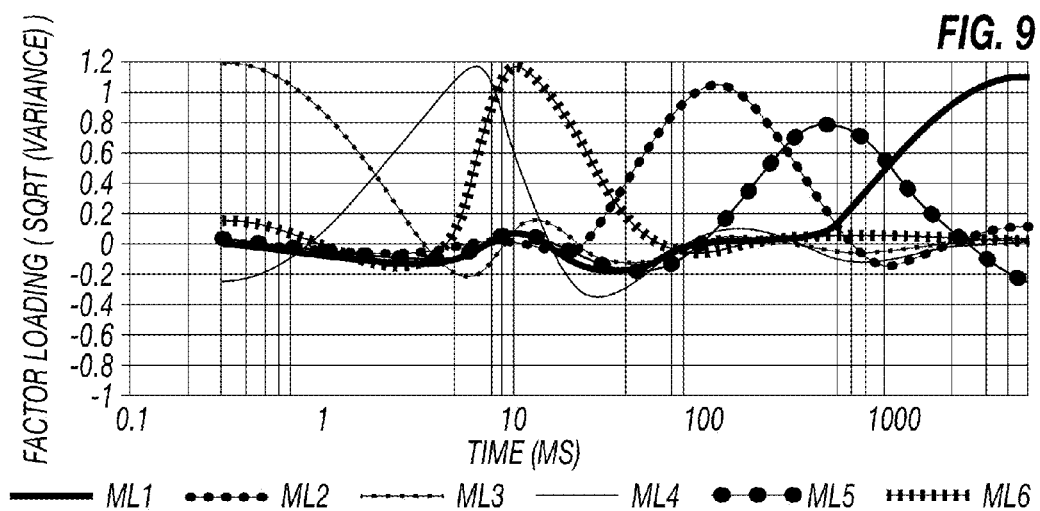
FIG. 9 shows an example of T2 data analyzed by factor analysis using six factors.

FIG. 7 shows an example of T2 data analyzed by factor analysis using only four factors. Values of each factor are plotted with respect to the relative loading (coefficient) for each factor. It may be observed in FIG. 7 that the factors do not appear to represent actual physical parameters. In this case, a particular criterion by which such representation may be evaluated is whether any of the coefficients (loadings) are significantly less than zero for any values of any of the factors. FIG. 8 shows factor analysis of the same T2 measurement data using five factors. FIG. 9 shows the same data analyzed using six factors. FIG. 9 may be considered an acceptable result because the number of factor loadings below zero appears to have been minimized. Referring back to FIG. 4, at 20 a determination is made as to whether the factor analyzed data may be considered to represent actual physical parameters. If yes, determinable as explained above, for example, the process may terminate at 26. The factors so determined may be used, for example, as input to an inversion procedure to determine physical parameters of the subsurface measurements made by one or more of the well logging instruments (e.g., as shown in FIGS. 1 and 2), or may be used in deterministic well log interpretation method to obtain corresponding results (e.g., coefficients of different type of porosities in a mixing algorithm to determine true porosity, or using the determined T2 distribution as in FIG. 9 to identify relative quantities of various types of water in the formations, example of which may include, without limitation, chemically bound water, clay bound water, rock mineral matrix bound water, surface tension bound, water free water and hydrocarbons such as oil).

If the results at 20 are determined not to be representative of actual physical parameters, then at 24 the number of factors may be incremented (e.g., by one factor) and the factor analysis may be repeated at 16 in FIG. 4. An example of the foregoing procedure is shown in FIG. 8. The foregoing process described with reference to FIG. 4 until the number of factors is determined to represent actual physical parameters at which point the process of FIG. 4 may end at 26. An example of the foregoing is shown in and was explained above with reference to FIG. 9.

Figure 10:
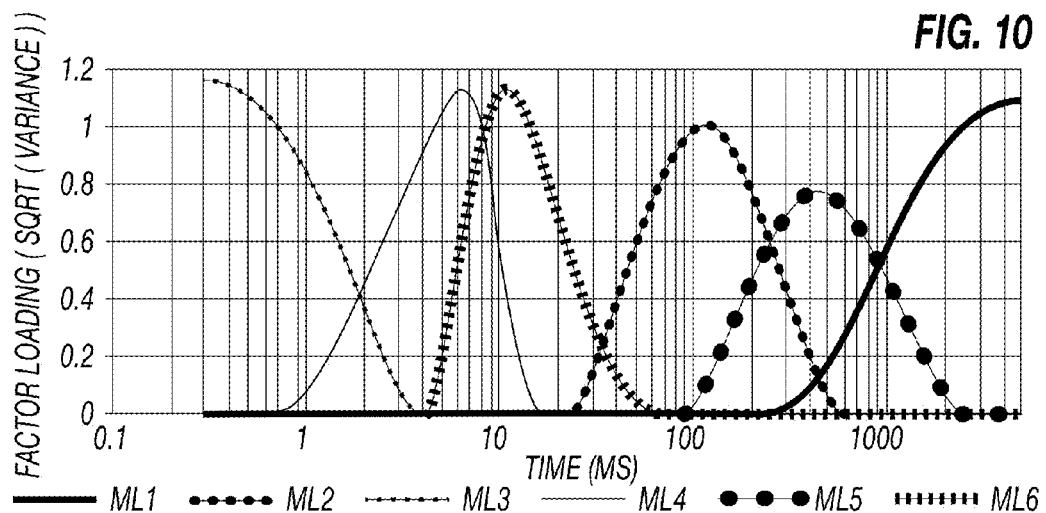
FIG. 10 shows the data in FIG. 9 to which is applied a "clean up."

Interpretation of factors in terms of unobserved and underlying characteristics affecting measurements may then be performed using a variety of graphical or tabular techniques. The foregoing interpretation may be performed on a computer system such as shown in FIG. 3. In the case of T2 distributions as shown in FIGS. 5-9, obliquely rotated factors are may be plotted with respect to T2 time. One observes the highest variances correspond very well with expected fluid T2 distributions, called "signatures", interpreted and identified as clay bound water, capillary bound water associated with silt and fine grained sand, free water, oil based mud filtrate and native oil. The acquired T2 distribution at every depth level can be represented as a linear sum of the product of the volume and signature for all fluids. Variance around the horizontal time axis or zero values are associated with noise on data and artifacts caused due to the inversion process from echo distribution ("regularization"). These values can be, in general, neglected providing "clean" T2 distributions for the formation fluids. An example of the foregoing "clean up" is shown in FIG. 10. For example, inversion of acquired data to desired formation/fluid/matrix characteristics: Once signatures are identified for underlying characteristics through factor analysis, acquired data can be inverted to desired characteristics using the same signatures or minimal user provided information. For example in the case of T2 distribution, a desired result may be to invert T2 distributions to obtain relative (fractional) fluid volumes. This can be performed using a matrix of fluid signatures (identified and cleaned as explained above) scaled to 1 as input parameters matrix to equation of form below where M is a matrix of T2 distribution with respect to wellbore axial position (depth), V is the matrix of volumes to computed with respect to depth and P is the parameter matrix of fluid signatures derived using the above factor analysis.

M=VP

T2 cutoffs for each fluid or pore type can be determined using signatures to be used as inputs in processing of acquired T2 distributions to solve for volume, logarithmic mean T2, permeability, viscosity etc at fluid or pore type level along with more advanced interpretation While the foregoing example technique is explained in terms of analysis of factors underlying observed NMR T2 distributions, it should be clearly understood that example methods herein may be equally used in analysis of other types of well log data. One example may be elemental yield analysis from gamma ray spectroscopy. In such examples, the well logging instruments such as explained with reference to FIGS. 1 and 1 may include an instrument having a pulsed neutron generator of types well known in the art and at least one scintillation type gamma ray detector coupled to a pulse height (multichannel) analyzer. Such instruments may enable determination of elemental presence and amounts thereof by analysis of numbers of detected gamma rays at certain energy levels. Such gamma rays may result from various interactions of neutrons from the neutron generator with atomic nuclei in the formations and wellbore, such as inelastic collisions and neutron capture.

Figure 11:
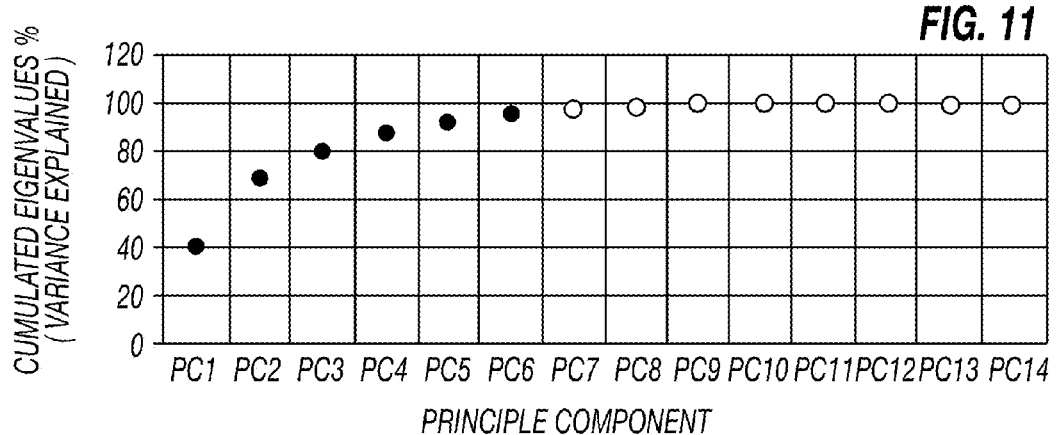
FIG. 11 shows PCA of gamma ray spectroscopy data.
Figure 12:
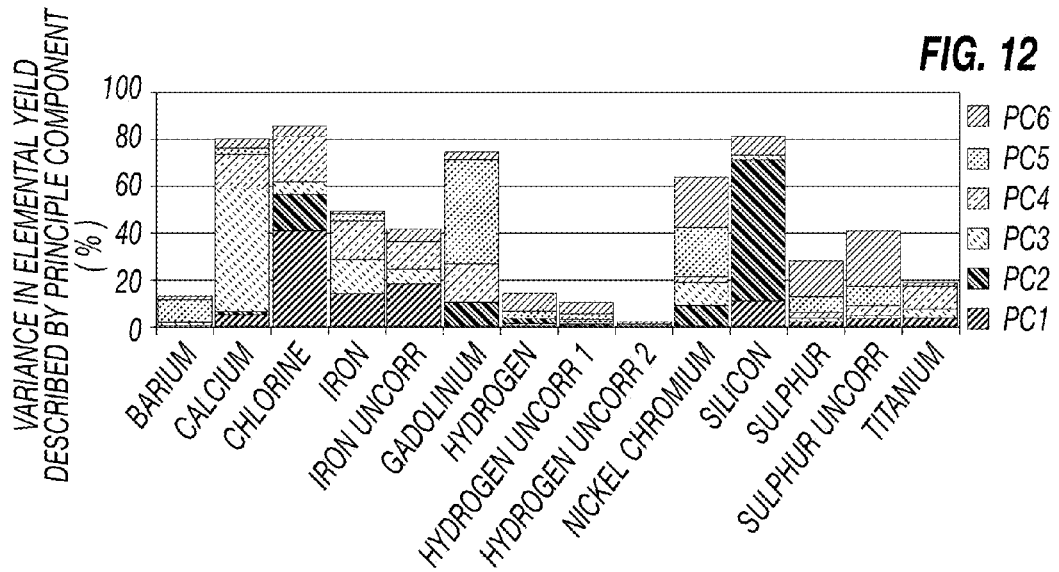
FIG. 12 shows principal components loadings (squared) and in percentage, describing the variance of an elemental yield described by each principal component.
Figure 13:
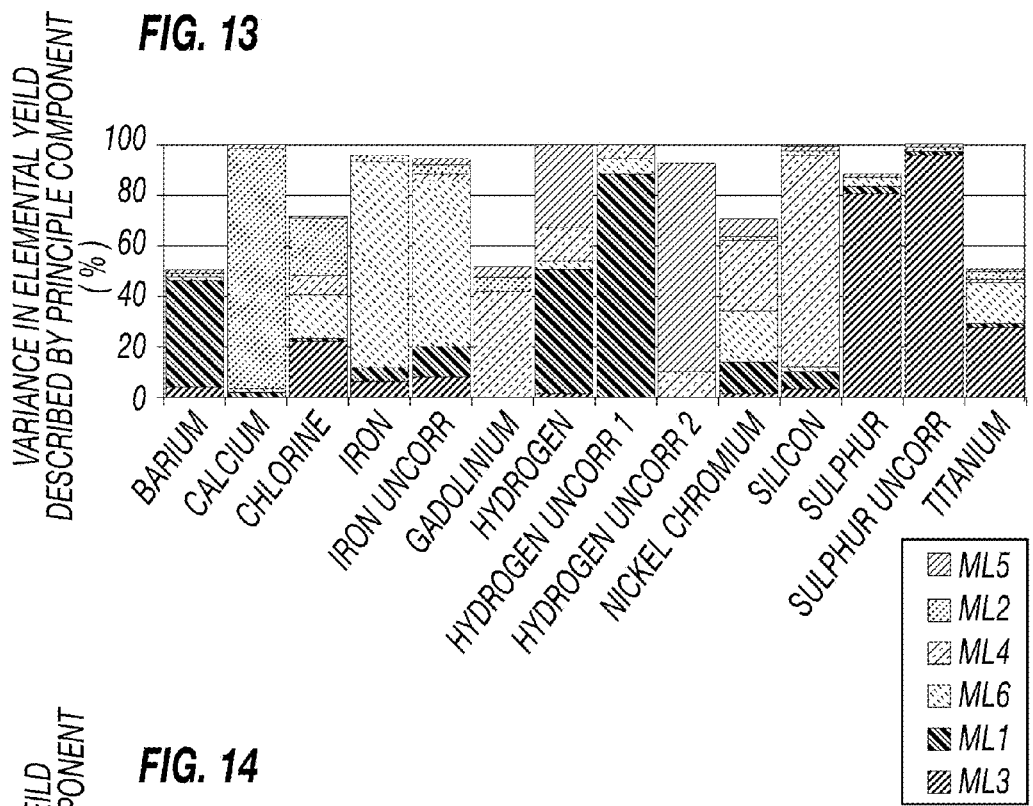
FIG. 13 shows factor analysis results of the data used to perform the PCA shown in FIG. 11.
Figure 14:
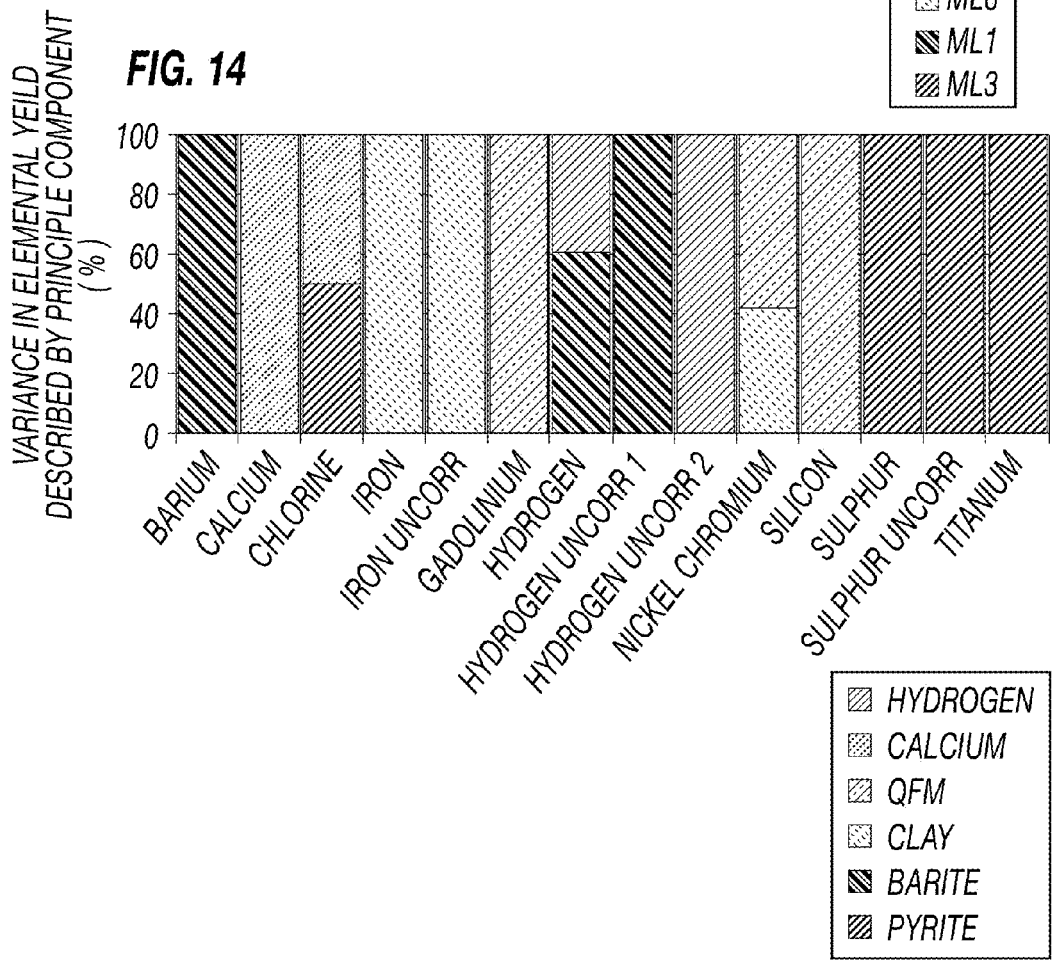
FIG. 14 shows the factor analysis results of FIG. 14 after clean up (e.g., selecting a minimum variance).
Figure 15:
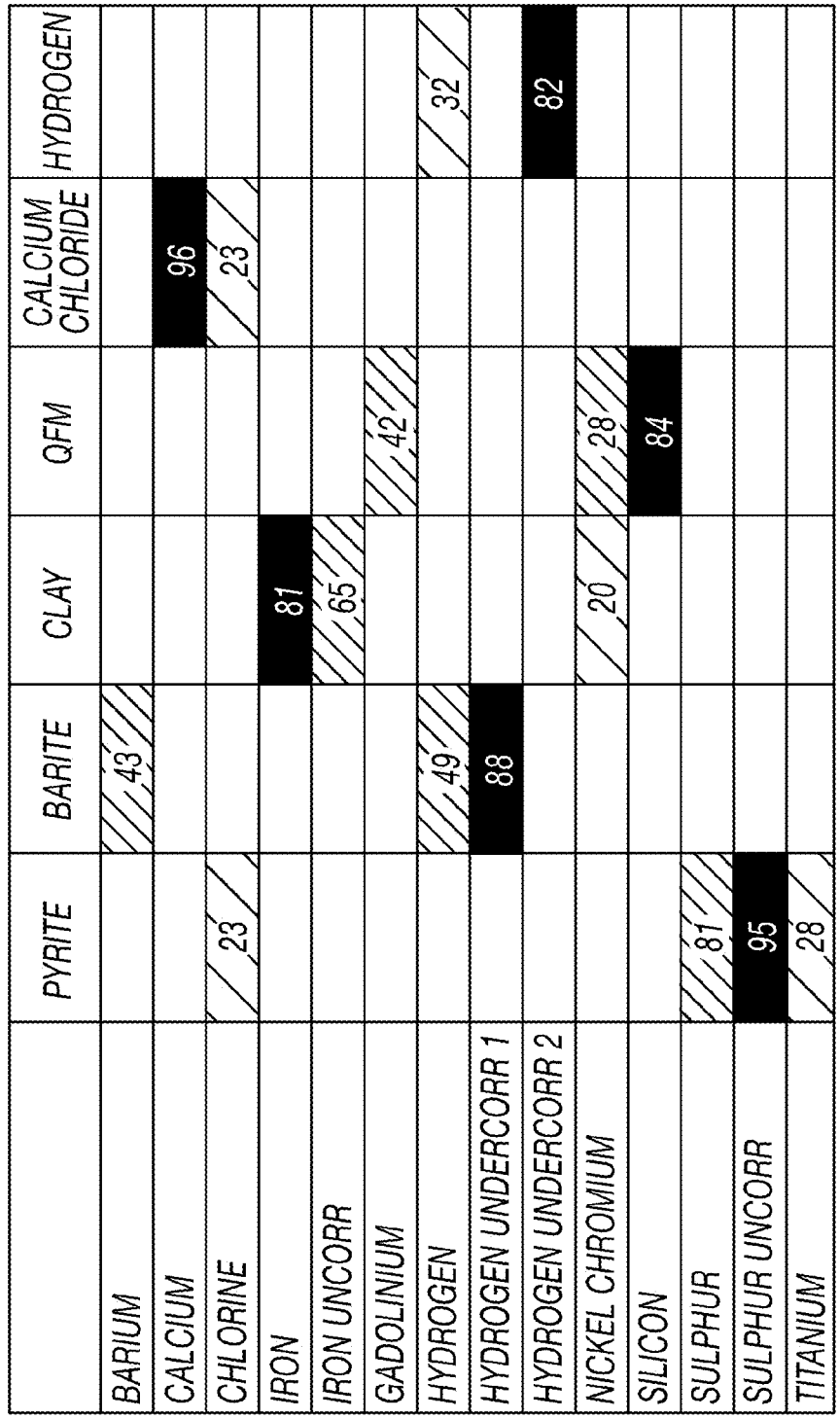
FIG. 15 shows a Factor Loading Matrix in table form using a cutoff of 20% variance.

FIG. 11 shows an example of PCA analysis of elemental yield data from gamma ray spectroscopy measurements. Note that only six principal components would describe 96% of the variance in the measured data. FIG. 12 shows principal components loadings (squared) and in percentage, describing the variance of an elemental yield described by each principal component. Note that the PCA does not readily provide interpretable results. FIG. 13 shows, for the same measurements, orthogonally rotated factor loadings squared and in percentage. Note that factor analysis appears to assist interpreting the underlying formation matrix mineralogy construct and appears to perform well in describing variances of all elemental yields. FIG. 14 shows results of using factor analysis on the same data including using a cutoff of 20% variance (which may be a minimum for higher confidence in data interpretation) and the remaining variance normalized to sum to 1 for each elemental yield. All elemental yields appear to cluster into interpretable groups. Both corrected and uncorrected measurements appear to group together with high correlation as expected. Grouping of measurements may help physical interpretation of the underlying factor as a common physical characteristic affecting that group of measurements, as shown in FIG. 15 where the same results as shown in FIG. 14 are shown in a tabular format.

Similarly, a factor loading matrix can be readily interpreted quite easily in tabular format for other "many-to-one" type of measurements. The foregoing two examples are not to be construed as limiting the scope of data on which the present example methods may be used.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for interpreting petrophysical measurement data, comprising:
    measuring at least one physical property of formations using a petrophysical measuring instrument in a wellbore;
    in a computer, arranging measurements of the at least one physical property of formations made by the petrophysical measuring instrument into a matrix representing the measurements and selecting a number of unobserved factors for factor analysis;
    in the computer, performing factorization of the matrix into the number of unobserved factors;
    in the computer, performing rotation of results of the factorization;
    in the computer, determining whether factor loadings for each of the unobserved factors has achieved a simple structure; and
    in the computer, when it is determined that each of the unobserved factors cannot be associated with a corresponding physical parameter of the formations, performing the following operations until each of the unobserved factors has achieved the simple structure such that each of the unobserved factors is associated with the corresponding physical parameter of the formations:
    adding one to the number of factors; and
    repeating the performing factorization of the matrix, repeating the performing rotation of the results of the factorization, and repeating the determining whether factor loadings for each of the unobserved factors has achieved the simple structure.

2. The method of claim 1 wherein the factorization of the matrix is performed by selecting the factors, factorizing the measurements and rotating the factorized measurements such that the factorized measurements correspond to a possible physical interpretation of the measurements.

3. The method of claim 1 wherein the factorization comprises principal axis or maximum likelihood factorization.

4. The method of claim 1 wherein the simple structure comprises all factor loadings of all factors greater than zero.

5. The method of claim 1 wherein the rotation comprises orthogonal rotation.

6. The method of claim 1 wherein the rotation comprises oblique rotation.

7. The method of claim 1 wherein the factors and loadings are used in the computer as input to an inversion process to determine physical properties of the formations.

8. The method in claim 1 wherein the factors and loadings are used in the computer to determine inputs to processing of the measurements to determine fluid or formation characteristics.

9. The method of claim 1 wherein the measurements comprise nuclear magnetic resonance transverse relaxation times.

10. The method of claim 1 wherein the measurements comprise measurements of gamma rays detected from the formation.

11. The method of claim 10 wherein the detected gamma rays are spectrally analyzed to estimate fractional amounts of selected chemical elements in the formations.

12. The method of claim 1 wherein the number of unobserved factors is determined by performing principal component analysis on the measurements.

13. The method of claim 12 wherein a number of principal components is selected whereby the number of unobserved factors accounts for a selected fraction of a total amount of variance in the measurements.

14. The method of claim 12 wherein a number of principal components is selected using a scree plot and determining thereon at the point of separation or an elbow.

15. The method of claim 1, wherein the petrophysical measurement data is multidimensional.

16. A method for well logging, comprising:
  moving a well logging instrument along a wellbore drilled through subsurface formations and measuring at least one physical property of the formations using the well logging instrument;
  in a computer, arranging measurements of the at least one physical property of formations measured by the well logging instrument into a matrix representing the measurements and selecting a number of unobserved factors for factor analysis;
  in the computer, performing factorization of the matrix using the number of unobserved factors;
  in the computer, performing rotation of results of the factorization;
  in the computer, determining whether factor loadings for each of the unobserved factors has achieved a simple structure; and
  in the computer, when it is determined that each of the unobserved factors cannot be associated with a corresponding physical parameter of the formations:
    adding one to the number of factors; and
    repeating the performing factorization of the matrix, repeating the performing rotation of the results of the factorization, and repeating the determining whether factor loadings for each of the unobserved factors has achieved a simple structure until each of the unobserved factors has achieved the simple structure such that the each of the unobserved factors is associated with the corresponding physical parameter of the formations.

17. The method of claim 16 wherein the factorization of the matrix is performed by selecting the factors, factorizing the measurements and rotating the factorized measurements such that the factorized measurements correspond to a possible physical interpretation of the measurements.

18. The method of claim 16 wherein the factorization comprises principal axis or maximum likelihood.

19. The method of claim 16 wherein the factorization comprises principal component analysis.

20. The method of claim 16 wherein the simple structure comprises all factor loadings being greater than zero.

21. The method of claim 16 wherein the rotation comprises orthogonal rotation.

22. The method of claim 16 wherein the rotation comprises oblique rotation.

23. The method of claim 16 wherein the factors and loadings are used in the computer as input to an inversion process to determine physical properties of the formations.

24. The method of claim 16 wherein the factors and loadings are used in the computer to determine inputs to measurement data processing to determine fluid or formation characteristics.

25. The method of claim 16 wherein the measurements comprise nuclear magnetic resonance transverse relaxation times.

26. The method of claim 16 wherein the measurements comprise measurements of gamma rays detected from the formation.

27. The method of claim 26 wherein the detected gamma rays are spectrally analyzed to estimate fractional amounts of selected chemical elements in the formations.

28. The method of claim 16 wherein the number of unobserved factors is determined by performing principal component analysis on the measurements.

29. The method of claim 16 wherein the number of unobserved factors is determined using a priori theory or retaining number of factors that gives the most interpretable results.

30. The method of claim 29 wherein a number of principal components is selected whereby the number of unobserved factors accounts for a selected fraction of a total amount of variance in the measurements.

31. The method of claim 16 wherein the well logging instrument is moved by extending or retracting an electrical cable in the wellbore, the well logging instrument coupled to an end of the electrical cable.

32. The method of claim 16 wherein the well logging instrument is moved by extending or retracting a drill string in the wellbore, the well logging instrument coupled within the drill string.

* * * * *